United States Patent
Lee et al.

(10) Patent No.: US 10,204,359 B1
(45) Date of Patent: Feb. 12, 2019

(54) SYSTEM AND METHOD FOR DETERMINING PURCHASE RECORDS OF MOBILE DEVICES TO PROVIDE EFFECTIVE MOBILE ADVERTISING

(71) Applicant: ADNOLI, LLC, Chicago, IL (US)

(72) Inventors: Spencer J Lee, Burr Ridge, IL (US); David N Purdy, Chicago, IL (US); Jason D Lobel, Chicago, IL (US); Preston A Harvey, Grayslake, IL (US); Massimo Ilario, Sperlonga (IT)

(73) Assignee: Adnoli LLC, Chicago, IL (US)

( * ) Notice: Subject to any disclaimer, the term of this patent is extended or adjusted under 35 U.S.C. 154(b) by 395 days.

(21) Appl. No.: 14/990,964

(22) Filed: Jan. 8, 2016

(51) Int. Cl.
G06Q 30/00 (2012.01)
G06Q 30/02 (2012.01)

(52) U.S. Cl.
CPC ..... G06Q 30/0267 (2013.01); G06Q 30/0255 (2013.01)

(58) Field of Classification Search
None
See application file for complete search history.

(56) References Cited

U.S. PATENT DOCUMENTS

| | | | |
|---|---|---|---|
| 8,255,283 B1 | 8/2012 | Foulser |
| 8,264,352 B2 | 9/2012 | Holley |
| 8,321,298 B2 | 11/2012 | Chou |
| 8,489,596 B1 | 7/2013 | Milton |
| 8,510,773 B1 | 8/2013 | Abou-Rizk |
| 8,621,244 B1 | 12/2013 | Rembert |
| 8,738,454 B2 | 5/2014 | Argue |
| 8,775,248 B1 | 7/2014 | Saldanha |
| 8,792,909 B1 | 7/2014 | Xu |
| 8,825,662 B1 | 9/2014 | Kingman |
| 8,863,178 B1 | 10/2014 | Abou-Rizk |
| 8,880,097 B1 | 11/2014 | Xu |
| 8,978,153 B1 | 3/2015 | Cuthbertson |
| 8,996,033 B1 | 3/2015 | Xu |
| 2011/0106719 A1 | 5/2011 | Wang |
| 2012/0290389 A1 | 11/2012 | Greenough |
| 2013/0226857 A1 | 8/2013 | Shim |
| 2013/0254227 A1 | 9/2013 | Shim |

(Continued)

OTHER PUBLICATIONS

Vista Media Digital Marketer, http://www.vistarmedia.com/solutions/digital-marketers.

(Continued)

Primary Examiner — Alvin L Brown
(74) Attorney, Agent, or Firm — The Law Offices of Konrad Sherinian LLC

(57) ABSTRACT

A mobile advertising system determines a sales transaction history of a buyer operating a mobile device. The sales transactions are generated by point-of-sales system. A portion of the transactions is matched to mobile device location records of the mobile device based on locations of the sales transactions, timestamps of the sales transactions, credit card data of the sales transactions, locations of the mobile device, and timestamps of the mobile device. The system further derives intelligence from the shopping history of the buyer's consumption. Based on the consumption intelligence about the buyer, the system sends improved advertising to the mobile device. The system also measures the effectiveness of the mobile advertising.

8 Claims, 10 Drawing Sheets

(56) References Cited

U.S. PATENT DOCUMENTS

| | | | |
|---|---|---|---|
| 2014/0025483 A1* | 1/2014 | Villars | G06Q 30/0242 705/14.45 |
| 2014/0223471 A1* | 8/2014 | Askren | H04N 21/23424 725/32 |
| 2014/0236669 A1 | 8/2014 | Milton | |
| 2014/0236706 A1 | 8/2014 | Opie | |
| 2015/0006282 A1 | 1/2015 | Opie | |
| 2015/0052132 A1 | 2/2015 | Ching | |
| 2015/0073893 A1* | 3/2015 | Brown | G06Q 30/0246 705/14.45 |
| 2015/0142551 A1* | 5/2015 | Papakipos | G06Q 30/0277 705/14.41 |
| 2015/0248694 A1 | 9/2015 | Chandra | |
| 2015/0262197 A1* | 9/2015 | Chao | G06Q 30/0201 705/7.34 |
| 2016/0092927 A1* | 3/2016 | Buron | H04L 67/18 705/14.58 |
| 2016/0275521 A1* | 9/2016 | Afshar | G06Q 30/012 |
| 2016/0292687 A1* | 10/2016 | Kruglick | G06Q 20/12 |
| 2016/0321679 A1* | 11/2016 | Dong | G06Q 30/0201 |
| 2017/0132666 A1* | 5/2017 | Slavin | G06Q 30/0267 |
| 2017/0238155 A1* | 8/2017 | Dobyns | H04W 4/023 455/456.1 |

OTHER PUBLICATIONS

RSi ANSA, http://www.retailsolutions.com/company/news-events/press-releases/rsi-launches-ansa-ground-breaking-service-measure-and-optimize.

NinthDecimal LCI, http://www.ninthdecimal.com/location-conversion-index-lci-measurement/.

\* cited by examiner

400

500

SYSTEM AND METHOD FOR DETERMINING PURCHASE RECORDS OF MOBILE DEVICES TO PROVIDE EFFECTIVE MOBILE ADVERTISING

CROSS REFERENCE TO RELATED APPLICATIONS

None.

FIELD OF THE DISCLOSURE

The present invention generally relates to a system and method for digital advertising, and more particularly relates to a system and method for mobile advertising. More particularly still, the present disclosure relates to a system and method for matching purchase history to mobile devices based on public data to provide more effective mobile advertising to the Internet connected mobile devices.

DESCRIPTION OF BACKGROUND

Advertising is a form of promoting and marketing products and services to potential buyers. With the rapid growth of Internet technologies and wireless communication technologies, online advertising and mobile advertising have become critically important for businesses to reach consumers. In particular, with the increasing popularity of smart phones (such as iPhones), mobile marketing is expanding at a high speed all over the world. As an interactive medium, mobile devices allow marketers to engage their target consumers with their brands within a given proximity to a location and through a medium frequently connected to a consumer. Mobile advertising is thus obtaining a far greater reach for product and service providers. Accordingly, various methods of mobile advertising have been proposed and practiced. For example, mobile web banner, short text, video billboard, mobile in-app display, and other means have become commercially available.

However, due to various factors, mobile advertising is still not an effective marketing tool. In response, targeted advertising onto mobile devices (such as smart phones, tablet computers, digital billboards, connected cars and watches, etc.) based on proprietary information has been proposed. To provide such targeted mobile advertising, a marketer analyzes a user's past purchase transactions and sends contextually relevant message (such as promotions) to the user's mobile device. This approach is feasible only when the marketer has knowledge of the identity of the user, the user's past purchase data and the user's mobile device identification. Such prerequisite information is not available in many other use cases.

U.S. Pat. No. 8,792,909 proposes matching a mobile device to a household based on the location data of the mobile device, and then targets the mobile device with promotions. U.S. Pat. No. 8,489,596 profiles a user of a mobile device based on location data of the mobile device. The goal is to derive intelligence on the user's behavior, and thus make targeted advertising to the user's mobile device.

However, the conventional methods for mobile advertising fail to obtain relevant, high-quality intelligence on consumers' past consumption to provide effective advertising onto their mobile devices and may result in spam, irrelevant or unwanted messages. A purchaser's consumption information includes, for example, the types of products, brands or categories of products, product prices, purchase pattern, amount of consumption, time of purchases, etc.

Accordingly, there is a need for a new system and method for matching consumers' past purchase records to their mobile devices, and provide more effective mobile advertising to the mobile devices based on consumption intelligence derived from the past purchase records. There is a further need for the new mobile advertising system and method to rely on publically available data alone, not private personal identification information ("PII") of the consumers. PII is data that could potentially identify a specific individual. In other words, PII data is information that allows one individual to be distinguished from another.

OBJECTS OF THE DISCLOSED SYSTEM, METHOD, AND APPARATUS

Accordingly, it is an object of this disclosure to provide a system and method to match sales transactions to mobile devices of the corresponding purchasers.

Another object of this disclosure is to provide a system and method to match sales transactions to mobile devices of the corresponding purchasers and create contextual segments for delivering relevant messages.

Another object of this disclosure is to provide a system and method to match public sales transactions to mobile devices of the corresponding purchasers using public mobile device location data.

Another object of this disclosure is to provide a system and method to match public sales transactions to mobile devices of the corresponding purchasers using public mobile device location data and credit card data.

Another object of this disclosure is to provide a system and method to match public sales transactions to mobile devices of the corresponding purchasers using public mobile device location data, credit card type and last-four digits of credit cards.

Another object of this disclosure is to provide a system and method to match public sales transactions to mobile devices of the corresponding purchasers using public mobile device location data, and retailer's Loyalty Card data.

Another object of this disclosure is to provide a system and method to match public sales transactions to mobile devices of the corresponding purchasers using public mobile device location data, and retailer's Loyalty Cards' entire numbers.

Another object of this disclosure is to provide a system and method to match public sales transactions to mobile devices of the corresponding purchasers using public mobile device location data, and retailer's Loyalty Cards' last-four digits.

Another object of this disclosure is to provide a system and method to iteratively match public sales transactions to mobile devices of the corresponding purchasers using public mobile device location data, credit card type and last-four digits of credit cards.

Another object of this disclosure is to provide a system and method to match sales transactions to mobile devices of the corresponding purchasers, derive intelligence into the purchaser' past consumption, and provide targeted mobile advertising to the mobile devices based on the intelligence.

Another object of this disclosure is to provide a system and method to match sales transactions to mobile devices of the corresponding purchasers, derive intelligence into the purchasers' consumption, provide targeted mobile advertising to the mobile devices based on the intelligence, and measure the effectiveness of the mobile advertising.

Another object of this disclosure is to provide a system and method for determining purchase records of mobile devices to provide contextually relevant metadata for analytics, digital marketing and advertising.

Another object of this disclosure is to provide a system and method to iteratively match public sales transactions to mobile devices of the corresponding purchasers using public mobile device location data and a unique retailer ID.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a system and method for matching purchase history to mobile devices based on public data to provide more effective mobile advertising to the mobile devices. The mobile advertising system includes a database, and a mobile advertising server. The mobile advertising server includes a memory, a processing unit accessing the memory, a network interface coupled to the processing unit and operatively coupled to the database, and a server software application operating on the processing unit. The mobile advertising server is adapted to communicate with a sales transaction server system and a mobile device location data server system over a wide area network via the network interface. The server software application is adapted to retrieve a first set of purchase records from the sales transaction server system, and retrieve a set of mobile device location data records from the mobile device location data server system. The set of mobile device location data records corresponds to a set of mobile devices; and the set of mobile device location data records includes a list of mobile device location data records of a first mobile device within the set of mobile devices. The server software application is also adapted to match a subset of purchase records of the first set of purchase records to the list of mobile device location data records. The subset of purchase records forms a first purchase history of a buyer operating the first mobile device. Moreover, the server software application is adapted to determine a first mobile advertisement for the first mobile device based on the first purchase history. The first mobile advertisement indicates a product. Furthermore, the server software application is adapted to send the first mobile advertisement to the first mobile device, and store the first mobile advertisement into the database.

The present disclosure facilitates data onboarding and derives benefits therefrom. Data onboarding bridges the gap between offline and online data. The present disclosure enables marketers and other business entities to leverage the rich troves of customer purchase history data for more accurate and targeted advertising and marketing.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
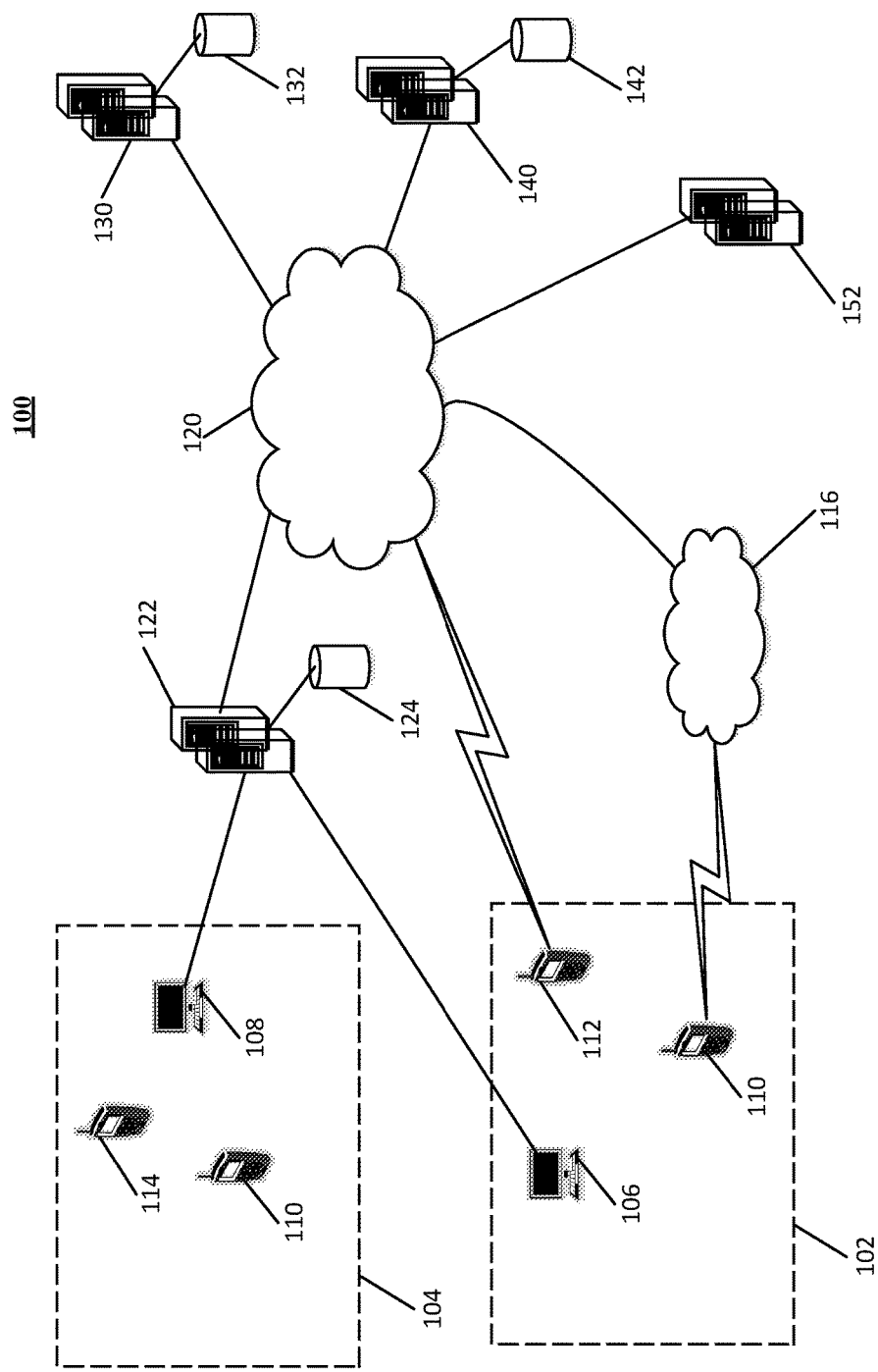
FIG. 1 is a simplified block diagram of a new mobile advertising system in accordance with this disclosure.

Turning to the Figures and to FIG. 1 in particular, a system for matching store sales records to mobile devices of the corresponding purchasers, and providing improved mobile advertising is shown and generally indicated at 100. The illustrative system 100 includes a mobile advertising server system 140 and a database 142 operatively coupled to the server system 140. The system 100 further includes a mobile device location data server system 130 and a database 132 operatively coupled to the server system 130. In addition, the system 100 includes a sales transaction server system 122 and a database 124 operatively coupled to the server system 122. The server systems 122, 130 and 140 communicate over a wide area network 120, such as the Internet. The system 100 also includes a set (meaning one or more) of point-of-sale ("POS") systems 106 and 108 disposed and operated in different retail stores 102 and 104 respectively. Purchasers (also referred to herein as users, consumers, shoppers and buyers) own and carry mobile devices 110, 112 and 114 (such as iPhones and other brands of smartphones) when they visit the stores 102 and 104 to purchase goods and/or services. The purchase transactions are conducted and entered using the POSes 106-108, which upload the purchase transactions to the server 122. The mobile devices 110-114 communicate with the system 100 via a public phone network 116 or WiFi networks that are operatively coupled to the wide area network 120. As used herein, the mobile devices 110-114 correspond to different and unique buyers carrying and operating the devices 110-114.

The server systems 122, 130 and 140 each include at least one server computer, and can be standalone servers, distributed server systems, server farm systems or cloud server systems. They are operatively coupled to and accessible over the wide area network 120. The servers 122, 130 and 140 each run a specialized server software application to provide functionality for matching sales transactions to mobile devices, and providing improved mobile advertising onto the mobile devices. When a server system is provided by, for example, Amazon's cloud computing service, the specialized server software application is deployed and runs on server computers of the cloud computing service. Server software applications can be written in computer programming languages, such as JAVA, PYTHON, C#, C++, PHP, etc. Each server computer within the server systems 122, 130,140 includes one or more processing units having one or more processors or processing cores, some amount memory and one or more network interfaces that are operatively coupled to the processing units.

The databases 124,132,142 can be, for example, relational database systems or other types of database systems, such as Google BigTable. The databases 124,132,142 store data which can be retrieved and modified. For example, when a sales transaction is made through the POS 108, the sales record (also referred to herein as a transaction, a purchase record and a receipt) is uploaded to the server 122, which then stores it into the database system 124. As used herein, the server system 122 represents independent server systems for different retail stores or retail store chains. For example, retail chains Walmart and Target use different server systems to process and maintain their respective inventories and sales transactions. The mobile advertising server system 140 periodically retrieves sales records from the server system 122 or directly from the database 124, and optionally stores them into the database 142. Alternatively, the server system 122 uploads the purchase receipts to the server system 140. In either case, the server system 140 is said to retrieve purchase records from the server system 122. In one implementation, the sales transaction data is Association of Retail Technology Standards ("ARTS") compliant. Where the sales transaction data does not follow ARTS compliant, it is normalized to a standard schema that follows ARTS.

The location and time information of the mobile devices 110-114 is tracked by the server system 130 and stored in the database system 132. Such location and time data (collectively referred to herein as location data) includes, for example, Global Positioning System ("GPS") coordinates (such as latitude, longitude and altitude), and a mobile device timestamp. A timestamp includes date and time when the underlying mobile device is at the location identified by the GPS coordinates. As used herein, a timestamp can also represents a range of date and time, such as 5:34 PM to 5:56 PM on Dec. 10, 2015. The location data of a mobile device is uploaded to, for example, the server system 130. Alternatively, the location data is derived from various other sources, such as advertising calls, wireless beacons, passive carrier data, social website check-in data, WiFi hotspots, etc. The derived location data is stored in, for example, the database 132.

The mobile advertising server system 140 periodically retrieves location data of the mobile devices 110-114 from the server system 130 or directly from the database 132, and stores it into the database 142. Alternatively, the server system 130 uploads the location data to the server system 140. In either case, the server system 140 is said to retrieve mobile device location data from the server system 130. It should be noted that the location data of a particular mobile device (such as 110) is also the location data of the user of the mobile device.

Figure 2:
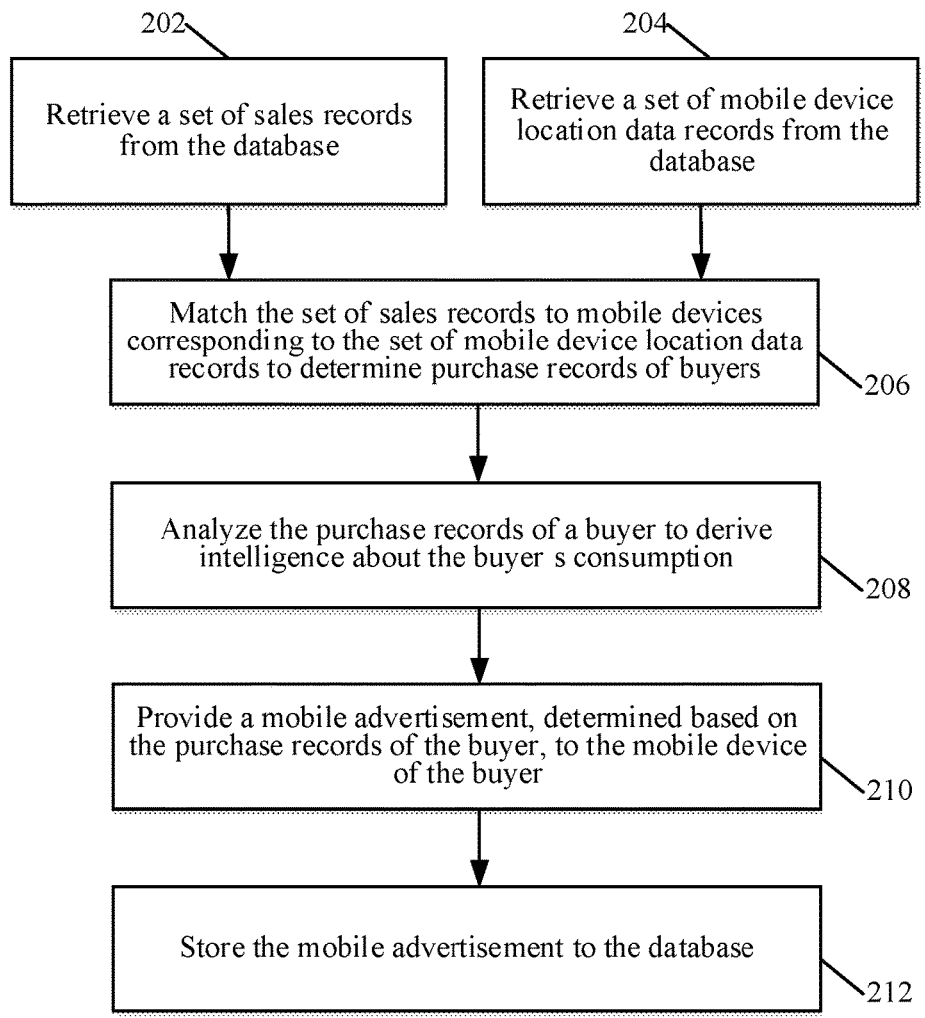
FIG. 2 is a flowchart depicting a process by which a new mobile advertising server system matches sales transactions to mobile devices of the corresponding purchasers, and provides improved mobile advertising to the mobile devices in accordance with the teachings of this disclosure.

Referring to FIG. 2, a flowchart illustrating a process by which the server 140 matches sales transactions to mobile devices of the corresponding buyers, and provides improved advertising to the mobile devices based on the buyers' purchase history is shown and generally indicated at 200. In other words, the process 200 allows the server 140 to determine the purchase history of a buyer of a particular mobile device, analyze the purchase history to derive shopping intelligence on the buyer, and provide improved advertising on the mobile device. For example, the buyer can be a segment like buyer of a certain brand of products. The matching can further enable third parties to generate more relevant advertising to the mobile device. At 202, the specialized mobile advertising server software application running on the server 140 retrieves a set of sales records from, for example, the database 142. The sales records are further illustrated by reference to FIG. 3.

Figure 3:
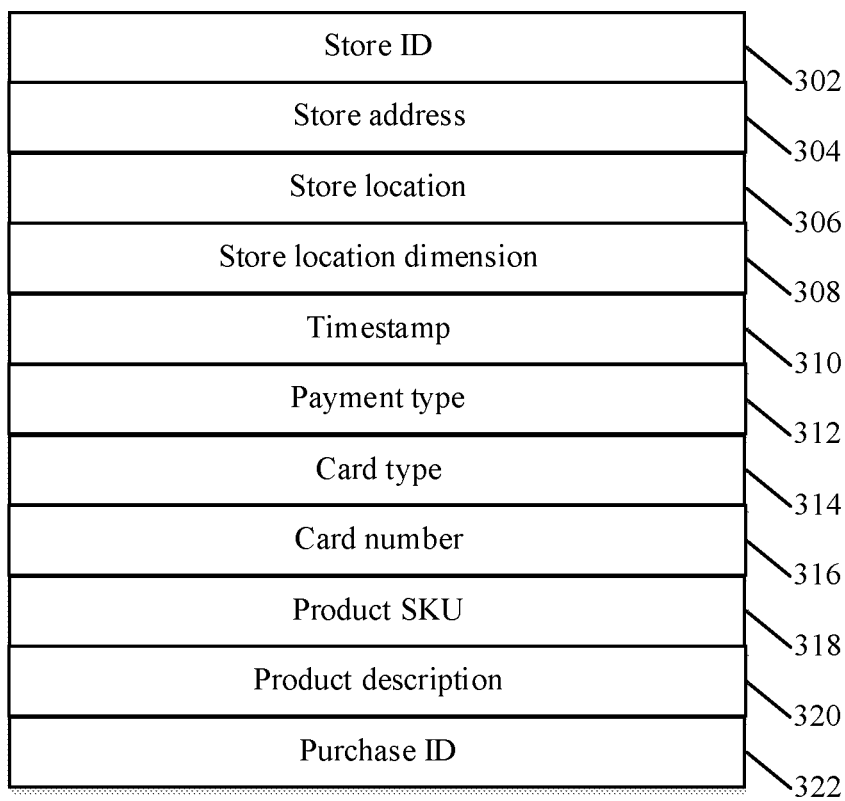
FIG. 3 is a simplified block diagram depicting a sales transaction record in accordance with the teachings of this disclosure.

Turning to FIG. 3, a simplified block diagram depicting an illustrative sales record 300 is shown. The purchase receipt 300 includes a store identifier ("ID") 302, a store address 304, a store location 306 (represented by, for example, GPS coordinates), a store location dimension 308 indicating the geographical dimensions of the store centered around the store location 306, a sales transaction timestamp 310, a payment type 312 of the transaction (such as cash, check, debit card, credit card, etc.), a credit card type 314 (such as VISA, MASTERCARD, AMERICAN EXPRESS, etc.), a last-four digit number 316 of the credit card number, one or more stockkeeping unit ("SKU") identifiers 318 indicating the products purchased in the transactions, and one or more product descriptions 320 of the purchased products. The credit card type 314 and the last-four digit number 316 are collectively referred to herein as a credit card ID. Moreover, the credit card type 314 and the last-four digit number 316 each are referred to herein as a credit card ID. A person of ordinary skill in the art would appreciate that the record 300 can include additional data elements.

In an alternate implementation, the field 314 indicates the type of a retailer Loyalty Card and the field 316 contains the entire number or the last-four digit of the retailer Loyalty Card. The last-four digit of either the retailer Loyalty Card or the credit card is public data. As used herein, the credit card data and the retailer Loyalty Card data are Payment Card Industry ("PCI") compliant. In a further implementation, the record 300 includes a purchase ID 322 which uniquely identifies the transaction. For example, it is generated when the record 300 is stored into the database 142. It should be noted that data contained in the record 300 is public data that is not protected under relevant privacy laws.

Figure 4:
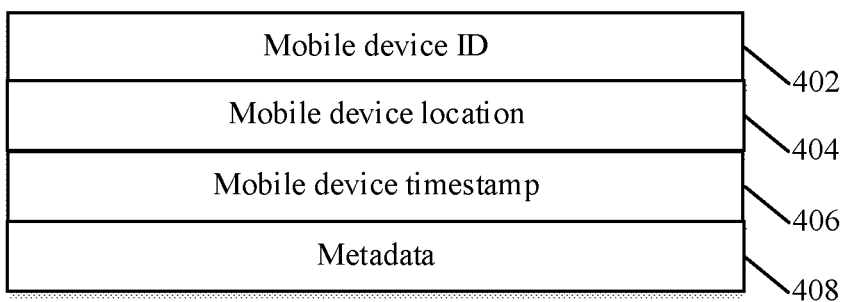
FIG. 4 is a simplified block diagram depicting a mobile device location data record in accordance with the teachings of this disclosure.

Turning back to FIG. 2, at 204, the specialized server software application retrieves a set of mobile device location data records from, for example, the database 142. The mobile device location data records are further illustrated by reference to FIG. 4. Referring now to FIG. 4, an illustrative mobile device location data records is shown and generally indicated at 400. The location record 400 includes a mobile device ID 402, a mobile device location 404 (such as a GPS latitude-longitude pair), a mobile device timestamp 406 indicating the time or a time range when the mobile device is located at the location 404, and additional data 408. The mobile device ID 402 can be an Identifier for Advertising ("IDFA") proposed by Apple Inc., an Android Advertising ID ("AAID") proposed by Google, or a Windows Advertising ID ("WAID") proposed by Microsoft or other unique mobile device identifier provided by an operating system or manufacturer. The ID 402 uniquely identifies a mobile device. It should be noted that data contained in the record 400 is public data that is not protected under relevant privacy laws. It should be noted that additional data elements can be included in the record 400.

Figure 8:
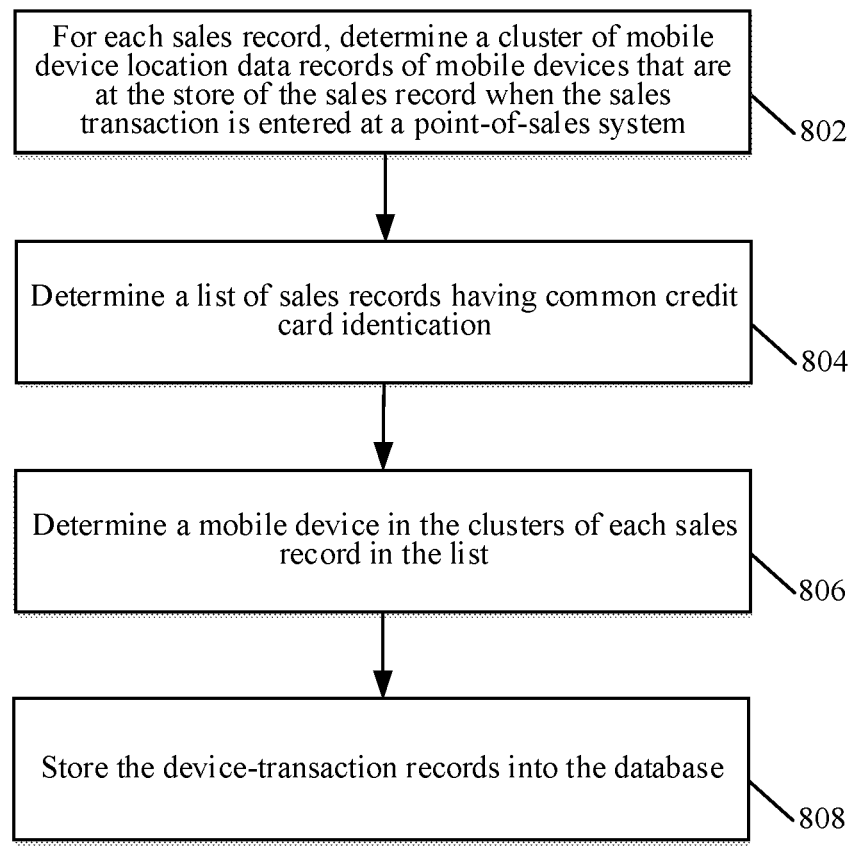
FIG. 8 is a flowchart depicting a process by which a mobile advertising server matches sales records to mobile devices of the buyers of such sales records in accordance with the teachings of this disclosure.

Turning back to FIG. 2, at 206, the specialized server software application matches sales records to mobile devices of the purchasers of products on the sales records. One illustrative matching process is shown by reference to FIG. 8. Referring now to FIG. 8, a flowchart depicting the process by which the server 140 matches sales records to mobile devices is shown and generally indicated at 800. At 802, for each sales record, the specialized server software application determines a cluster of mobile device location data records of mobile devices that are located at the store when the underlying sales transaction is created through, for example, a POS. Accordingly, at 802, a transaction-to-devices map between each sales transaction and a cluster of mobile devices is formed. A mobile device (such as 110) is said to be at or located at a store (such as 102) when the GPS location 404 of the mobile device 110 is within the store location dimension 308 from the store location 306, and the timestamp 310 of the sales record matches the timestamp 406.

The GPS location 404 of the mobile device 110 is said to be within the store location dimension 308 from the store location 306 when the location 404 is within the geographical area (such as a rectangle or a circle centered around the store location 306) defined by the store location dimension 308 and the store location 306. The timestamp 310 is said to match the timestamp 406 when the timestamp 310 is same as the timestamp 406, the timestamp 310 is within the timestamp 406 in the case where the timestamp 406 is a range of time, or the timestamp 310 is within a predetermined range (such as one minute) from the timestamp 406.

It should be noted that the process 800 can be performed iteratively to improve matching accuracy and process new sales records. In addition, other matching methods can be applied to determine the buyer or buyers of a given set of sales transactions. At 804, the specialized server software application determines a list of sales records having a common credit card type 314 and a common last-four digit number 316. It should be noted that each sales record in the list corresponds a mobile device cluster and a transaction-to-devices map. In addition, at 804, the server application may determine multiple lists of sales records.

At 806, the specialized server software application determines a mobile device, such as the mobile device 110, which is present in the mobile device cluster of each sales record in the list of sales records identified at 804. Alternatively, at 806, the specialized server software application determines a mobile device that is present in the mobile device clusters of a certain portion (such as 80%) of sales records in the list of sales records identified at 804. At 808, the specialized server software application stores the associations between the mobile device determined at 806, and the sales records in the list into the database 142. The association, also referred to herein as device-transaction record and purchaser-transaction record, is further illustrated by reference to FIG. 5.

Figure 5:
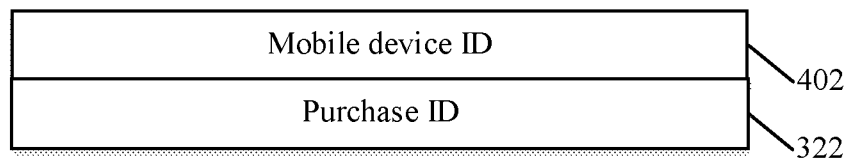
FIG. 5 is a simplified block diagram illustrating a mobile device-transaction record in accordance with the teachings of this disclosure.

Referring to FIG. 5, a simplified block diagram illustrating a mobile device-transaction record is shown and generally indicated at 500. The record 500 includes a mobile device ID 402 and a purchase record ID 322. A collection of the records 500 of a common mobile device identifies a purchase history (also referred to herein as shopping history) of the buyer owning the mobile device.

Turning back to FIG. 2, at 208, the specialized server software application analyzes the purchases of buyers, such as a buyer corresponding to the mobile device 110. The analysis results in intelligence about the purchase behavior, purchased products, products of likely future purchases, consumption power, and other information of the buyer. For example, at 208, the server 140 determines that the buyer of the mobile device 110 purchases a pack of soft drinks each week.

At 210, the specialized server software application applies the intelligence into the buyer's consumption, and provides targeted mobile advertising to the mobile device 110 of the buyer. For example, the specialized server software application sends a promotion (also referred to herein as mobile advertisement) for soft drink of a particular brand to the mobile device 110. As an additional example, the application receives match metadata and can send a contextually relevant promotion to the device 110. The promotion indicates, for example, the brand, the product, the price, a discount, and/or other marketing information. At 212, the specialized server software application stores the promotion sent to the mobile device 110 into the database 142. The stored information at 212 is also referred to herein as a mobile advertisement record, which indicates the promotion, the mobile device 110, the time of the improved mobile advertisement, and other information.

Figure 6:
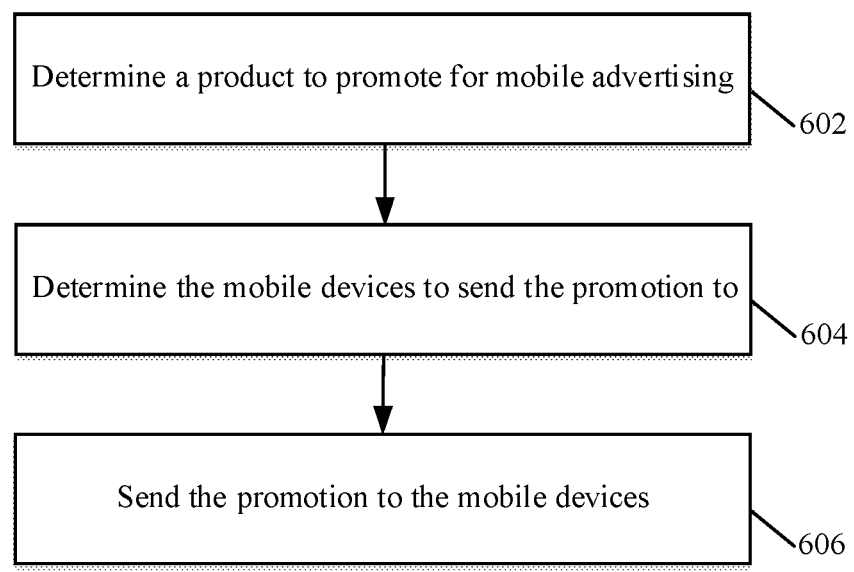
FIG. 6 is a flowchart depicting a process by which a mobile advertising server provides targeted mobile advertising to mobile devices in accordance with the teachings of this disclosure.

Referring to FIG. 6, a flowchart depicting a process by which the server 140 performs the element 210 is shown and generally indicated at 600. At 602, the server determines a product to promote using the improved mobile advertising. For example, products are categorized into segments. Each buyer's purchase history is then analyzed to determine the segments of products that the buyer has purchased. The selected product, such as a new brand or type of soft drink, is chosen from one of the segments. At 604, the specialized server software application determines the mobile devices to send the promotion to. For example, at 604, the server 140 selects a group of mobile devices of buyers who have purchased the same type of product in the last week or month. At 606, the specialized server software application sends the promotion to the selected mobile devices over the network 120. The mobile advertisement can be sent to the mobile devices through one or more mobile applications, web pages, audio, video, application programming interview ("API"), web services, or other type of media.

Figure 7:
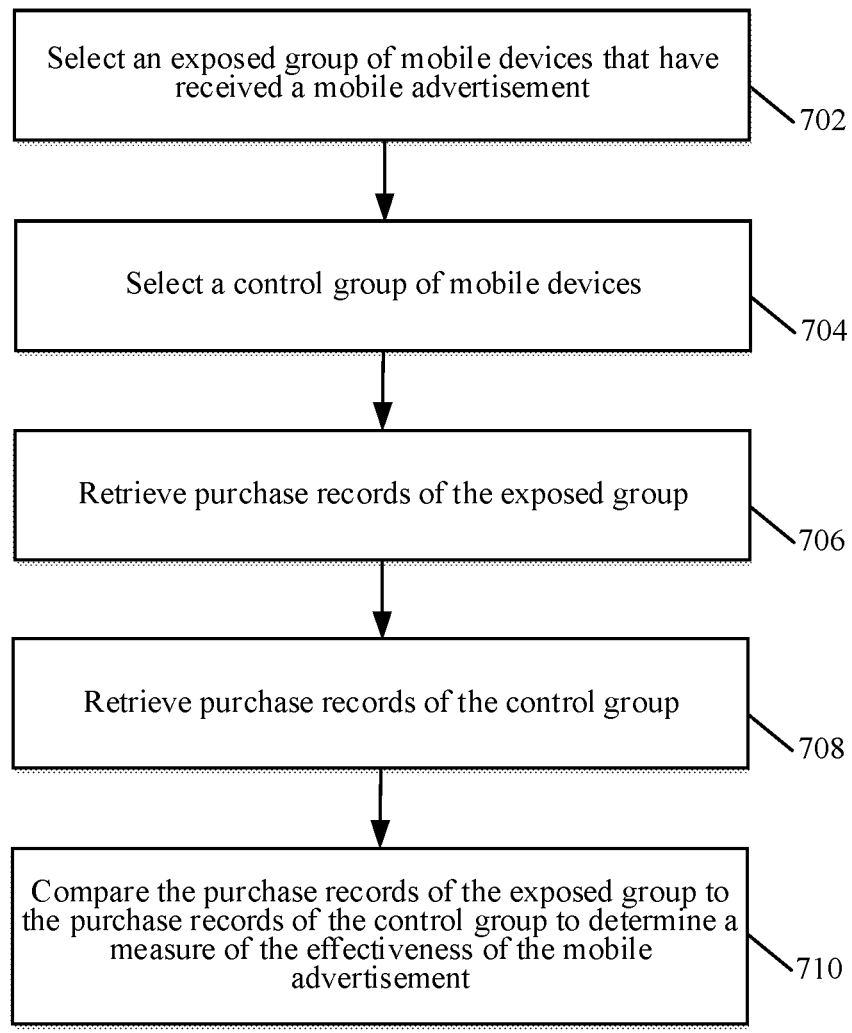
FIG. 7 is a flowchart depicting a process by which a mobile advertising server determines the effectiveness of mobile advertising to mobile devices in accordance with the teachings of this disclosure.

The present teachings can also be used to determine the effectiveness of the mobile advertising, which is further illustrated by reference to FIG. 7. At 702, the specialized server software application running on the server 140 selects a group of mobile devices that have received a particular mobile advertisement. This group of mobile devices is referred to herein as an exposed group of mobile devices. The buyers owning the exposed group of mobile devices are referred to herein as an exposed group of buyers. At 704, the specialized server software application selects a second group (also referred to herein as a control group of mobile devices) of mobile devices. The buyers owning the control group of mobile devices are referred to herein as a control group of buyers. The control group does not receive the mobile advertisement. In addition, the control group of buyers has the same or similar purchase history as the exposed group of buyers. For example, the two groups have purchased similar products of similar prices with similar purchase pattern.

At 706, the specialized server software application retrieves purchase records of the exposed group of buyers. The retrieved purchase transactions are entered after the mobile advertisement is sent to the exposed group of mobile devices. At 708, the specialized server software application retrieves purchase records of the control group of buyers. The retrieved purchase transactions are entered after the mobile advertisement is sent to the control group of mobile devices. At 710, the specialized server software application compares the purchase records of the exposed group of buyers to that of the control group of buyers to determine the effectiveness of the mobile advertisement sent to the exposed group of mobile devices. For example, where the mobile advertisement is a promotion for a new tablet computer model from a particular maker. The total purchases of the new computer model by the exposed group is determined and compared to that of the control group. For instance, where the respective total sales are $200,000 and $100,000, the effectiveness of the improved mobile advertising is thus 200%.

In a further implementation, the system 100 includes a third-party server system 152, such as a marketer's server system. In such a case, the server system 152 receives the consumer intelligence information from the server system 140 and then performs the process 600.

Figure 9:
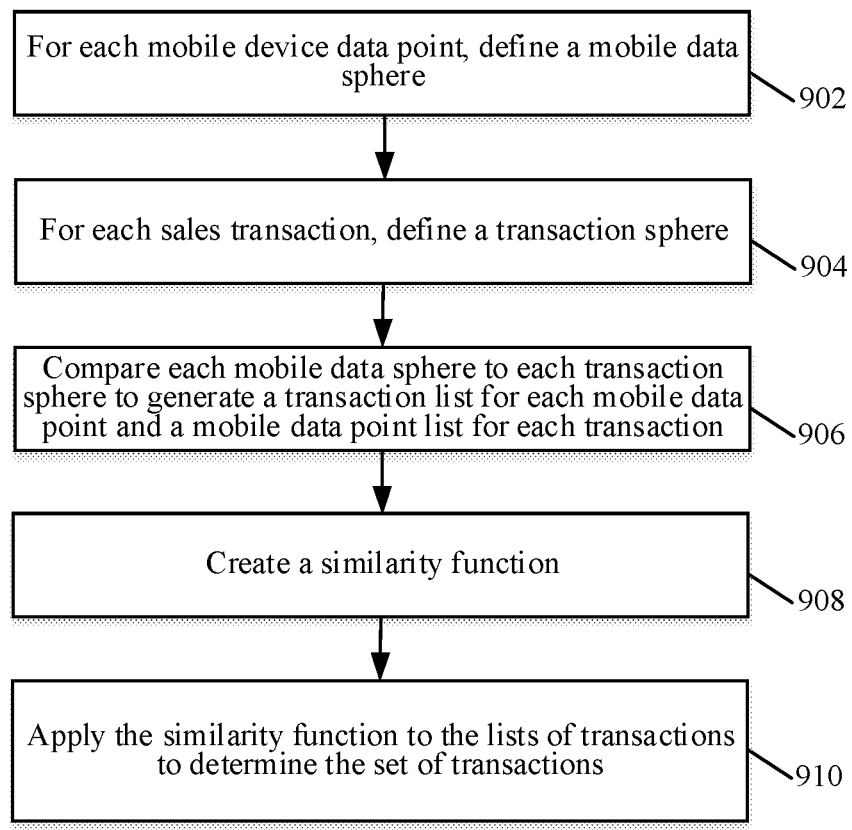
FIG. 9 is a flowchart depicting a process by which a server matches sales records to mobile devices in accordance with the teachings of this disclosure.

Referring now to FIG. 9, a flowchart depicting a process by which the server system 140 performs element 206 (FIG. 2) is shown and generally indicated at 900. At 902, the server software application running on the server 140 defines a mobile data sphere <MCi, d, t> for each mobile data point MC=(id, ts, l). i is a positive integer serving as an index; d is a physical distance from the location reported for that mobile device ID 402; t stands for a radius of time in seconds from the mobile device timestamp 406; id stands for the mobile device ID 402; ts stands for the mobile device timestamp 406; and l stands for the mobile device location 404. Accordingly, each MC corresponds to a record 400.

At 904, the server software application defines a transaction sphere <Ti, d, t> for each sales transaction T=(id, ts, l, items). Here, d stands for a distance from the store location 306 of the sales transaction; t stands for a radius of time in seconds from the timestamp 310; id stands for the purchase ID 322; ts stands for the timestamp 310; l stands for the store location 306; and items stand for the product SKU 318 or a collection of purchased items in general.

At 906, the server software application compares every mobile data sphere <MCi, d, t> to every transaction sphere <Ti, d, t> to produce two datasets. The first dataset is keyed by the tuple <MCi, d, t> while the second dataset is keyed by the tuple <Ti, d, t>. When the mobile data sphere <MCi, d, t> overlaps with the tuple <Ti, d, t>, the corresponding mobile data point and transaction are paired. Accordingly, for each mobile data point MCi, a list of transactions Tmc=(T1, T2, . . . ) are paired with MCi. This list is also denoted herein as MCresults. Similarly, for each transaction Ti, a list of mobile data points MCt1=(MC1, MC2, . . . ). This list is also denoted herein as Tresults. The overlap of two spheres can be determined based on Euclidean distance, Manhattan metric, or other metrics.

Accordingly, for each mobile device ID 402, there is a set of corresponding mobile data points {MC1, MC2, . . . } and, a list of transactions for each mobile data point. The two dimensional data map can be represented as: Tmid={Tmc1=(T1, T2, . . . ), Tmc2=(T3, T4, . . . ), Tmc3=(T5, T6, . . . )}, mid stands for mobile device ID 402. To filter the list Tmid and extract a set of sales transactions made by the user of the mobile device, at 908, the server software application creates a similarity function SF(T1,T2), which takes any two transactions and returns a value between [0,1] inclusively and continuously. A similarity of 0 indicates the two objects are not similar. A value of 1 indicates the objects are identical. The purpose of the function is to measure the similarity of any two transactions consistently and objectively. Example implementations for this function include the Jaccard Index on the transaction items, and modified Jaccard index with an additional point-at-infinity, Tanimoto similarity, and Sorensen-Dice index. In a further implementation, machine-learned similarity functions are created using supervised and unsupervised learning algorithms. Such similarity functions are created using, for example, training set of known purchase history.

At 910, the server software application applies the similarity function to {Tmc1=(T1, T2, . . . ), Tmc2=(T3, T4, . . . ), Tmc3=(T5, T6, . . . )}. For example, the server software application applies the similarity function to every combination of transactions pairwise of TMid. The application determines the set of transactions made by the user of the mobile device.

In a further implementation, the transaction vector (id, ts, l, items) is expanded to include additional data, such as transactional meta-data. For example, Tenriched=(id, ts, l, items, metaData1, metaData2, . . . ). The additional transaction meta-data elements include, for example, product size, product brand, purchase tender meta-data (such as credit card numbers, loyalty numbers, NFC identifiers, etc.). Such additional meta-data points can be used to generate modified similarity functions using more sophisticatedly trained machine learned outputs. The additional dimensions of vector clustering can produce more accurate determination of a mobile device user's sales transactions.

Figure 10:
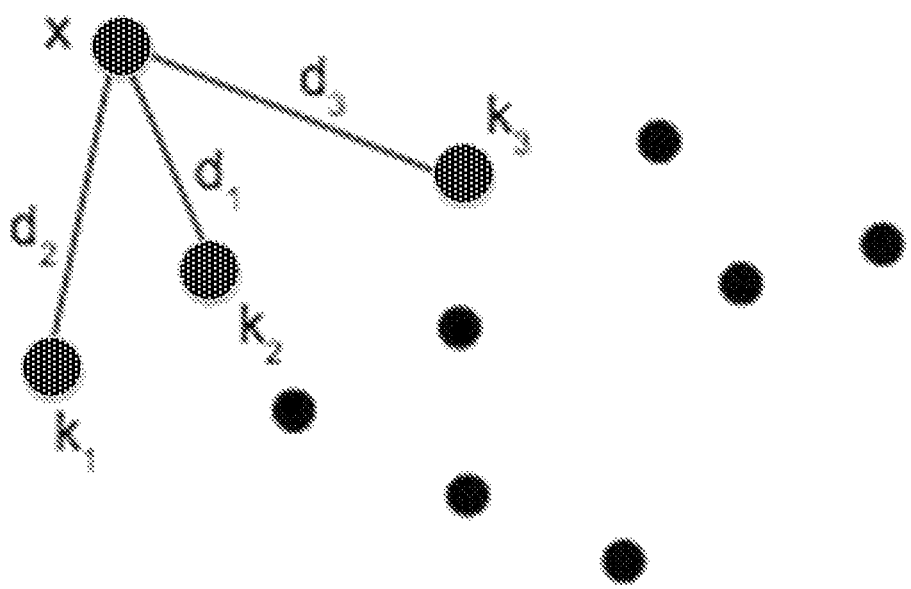
FIG. 10 is an illustrative diagram of data points and distances in accordance with the teachings of this disclosure.

In one implementation, instance-based machine learning algorithms (such as nearest-neighbor) are used for matching a mobile device to a list of sales records. Nearest neighbors (also known as similarity search) consist of a series of unsupervised neighbors-based learning algorithms, techniques and data structures that are applied to a data set X of n points in a k-dimensional vector space V to find k points (such as POS transactions) that are nearest to a given input point (such as mobile device data point) or a set of points in Y, which are further illustrated in FIG. 10. x stands for a mobile data point; kn stands for a sales transaction; and $d_n$ stands for distance between a mobile data point and a transaction. The various nearest neighbors approaches depend on few factors, such as number of data points, number of features (meaning dimensions) and similarity. The similarity is determined by, for example, distance functions (such as Euclidean, Cosine, Jaccard, 1-norm, . . . ).

Linear search, K-D Tree and Ball Tree algorithms can be used to match mobile devices to respective purchase history. Linear search is a brute-force method used to find the nearest-neighbor of a point x in a database Y. Linear search includes the computation of the distances between the point x (meaning mobile device data point) and all points (meaning sales transactions T) in Y, and sorting the distances to find the smallest ones. Smaller distance means higher similarity between the objects. A similar linear approach includes computing the distance from point x to every other point in the database Y, and keeping track of the shortest distance. In such a case, the system does not need to sort the distances. No additional space complexity is necessary.

For a low-dimensional space (such as spaces with less than 20 dimensions). a tree-based data structure, K-D Tree (also known as K-dimensional tree) can be used to organize data points in a space with k-dimensions. Using the K-D Tree data structure, if a point MC (meaning a mobile data point) is very distant from a point $T_1$ (meaning a sales transaction), and point $T_1$ is close to a point $T_2$ (meaning a sales transaction), then point MC and $T_2$ are also distant from each other are thus not similar. Consequently, $T_2$ can be discarded without having to explicitly calculate its distance from MC. Accordingly, with the K-D Tree algorithm, the computational cost of nearest-neighbor algorithm can be reduced drastically.

If the datasets (such as Tmc1) have a high number of dimensions, the Ball Tree can be a more efficient data structure for determining a mobile device user's sales records. Ball Tree speeds up the discovery of neighbor points. While the KD-trees partition data is based on Cartesian axes, in Ball Trees the data is partitioned into D-dimensional hyperspheres (also referred to as balls), represented each by a tree node containing a subset of points to be searched. Each point can only belong to one ball based upon its distance from the ball's center (also referred to as centroid). Each leaf node in the tree defines a ball and defines all data points inside that ball. During a neighbor search, the algorithm maintains a priority queue of the k-nearest points. For each visiting node, any subtree whose distance from the MC is greater than the furthest point encountered can be ignored for the rest of the search. The tree pruning reduces complexity. A point MC must fall within any of the hyperspheres. All the points $T_n$ in the same hypersphere will be considered nearest, hence similar to the point MC.

Brute-force approach can be computationally very expensive when the databases are large and contain with billions of records where each record may have hundreds of dimensions. In such a case, similar items can be quickly found using locality-sensitive hashing for approximate or near matches. However, this will not find the exact matches but only the most similar pairs or all pairs above a certain similarity threshold. With this approach, every data point (such as a mobile device data point) will be hashed and it's expected that similar data points (such as transactions), such as those points that have a small distance from each other, will have a similar hash value. With a high probability, these points are going to be hashed to the same bucket. With locality sensitive hashing techniques, as often happens in machine learning, a series of distance measures can be used to find distance between vectors, such as Euclidean, Cosine, Edit, Hamming and Jaccard.

A min-wise hash using Jaccard index can be used as the hashing method. The Jaccard Similarity can be defined as follow:

$$J(A,B)=|A \cap B|/|A \cup B|$$

Jaccard Similarity defines the number of items two sets have in common divided by the total number of items in both sets. J=1 if the sets contain exactly the same items, while J=0 if the sets have no items in common. Any items in between are defined by (0<=J<=1).

If a mobile device data point and a sales transaction define the sets and the features in each vector define the elements of each set, then the similarity between them can be computed. In practice, the function will calculate the probability that an element from the sets is also in their intersection. More elements (meaning features) are common to both sets. A higher probability means a higher similarity between the mobile device data points and the sales transaction vectors. Using the MinHash approach, the system 100 estimates the Jaccard similarity for each pair J(A,B) more efficiently without having to calculate union and intersection for each set, which can be computationally expensive.

In a further implementation, the server 140 tracks and stores the user's interaction (such as clicks) with mobile advertisements sent to the mobile device 110. The server 140 then use such data to refine collaborating filtering and deep machine learning models to make more accurate recommendations of goods to the user.

Various collaborative filtering techniques can be used to examine a shopper's POS history to find similarities with other shoppers and/or correlations between items. Such models are based on explicit or implicit ratings, preferences, likes, etc. In one implementation, the system 100 does not take into consideration any product features or descriptive text, since the system 100 may not be aware of the type of item, or details about the items the shopper is interacting with, except that the user has expressed a certain preference for the item. Some drawbacks of collaborative filtering can be overcome using content-based algorithms that calculate similarities using item metadata and content such as keywords, tags, or any text describing the product and user's profile. This approach focuses mainly on similarities between items, rather than which user has interacted with the items.

A machine deep learning system can analyze POS sales data and learn patterns and shopper's profiles. Such a learning system can be used to model the interest and habits of shoppers over time. The neural network composed of various layers, using input and output nodes learns and adapts continuously according to the shopper's preferences and interactions with the mobile advertisements. Whether the shopper has interacted positively or negatively, new data is added to the neural network, reshaping it and updating shopper's profiles to discover new patterns and interests more accurately. Using neural network to build and recognize patterns between users and items. Such patterns are then enhanced by using collaborative filtering and content-based to serve personalized content.

In a further implementation, the accuracy and effectiveness of the promotions to a mobile device user is evaluated using one or more techniques, such as A/B testing, Root Mean Squared Error ("RMSE"), etc. A/B testing checks whether the system 100 actually increases usage, web traffic, clicks, etc. Selecting a test user putting on the side part of the training data. The recommendation system then generates recommendations for the test user based only on a part of the user history. The new recommended items are compared to the data that was held back to see if the predictions are correct. RMSE predicts rating for a test set of user-item pair which are compared to the real ratings from a test set of training data. The average difference from the real value is calculated. Precision is defined by the ratio of the number of relevant recommendations and the top N (meaning a positive integer) recommendations made. A precision score of 1.0 means that every recommendations from the top N list was relevant. Recall is defined by the ratio of the number of relevant recommendations and the total number of relevant recommendations. A recall score of 1.0 means that all relevant recommendations were in the top N list.

Obviously, many additional modifications and variations of the present disclosure are possible in light of the above teachings. Thus, it is to be understood that, within the scope of the appended claims, the disclosure may be practiced otherwise than is specifically described above. For example, the process 800 is implemented using machine learning methods and statistical models to match sales records to mobile devices more accurately. As an additional example, the process 200 is performed iteratively to improve matching accuracy. As still a further example, the measure of mobile advertising effectiveness is determined based on the number of units sold to the exposed group and the control group respectively.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A mobile advertising system comprising:
   i. a database;
   ii. a mobile advertising server having a memory, a processing unit accessing said memory, a network interface coupled to said processing unit and operatively coupled to said database, and a server software application operating on said processing unit, wherein said mobile advertising server is adapted to communicate with a sales transaction server system and a mobile device location data server system over a wide area network via said network interface;
   iii. said server software application adapted to:
      (1) retrieve a first set of purchase records from said sales transaction server system;
      (2) retrieve a set of mobile device location data records from said mobile device location data server system, wherein said set of mobile device location data records corresponds to a set of mobile devices;
      (3) for each purchase record within said first set of purchase records, determine a cluster of mobile device location data records within said set of mobile device location data records, wherein a cluster of mobile devices corresponding to said cluster of mobile device location data records are at a store of said purchase record, thereby forming a transaction-to-devices map between each purchase record within said first set of purchase records and a cluster of mobile device;
      (4) determine a list of purchase records that have a common credit card identifier, wherein said list of purchase records are within said first set of purchase records and corresponds to a list of clusters of mobile devices;
      (5) determine a first mobile device wherein said first mobile device is present in a subset of said list of clusters of mobile devices, wherein said subset of clusters of mobile devices corresponds to a subset of purchase records within said list of purchase records;
      (6) determine a first mobile advertisement for said first mobile device based on said subset of purchase records, wherein said first mobile advertisement indicates a product;
      (7) send said first mobile advertisement to said first mobile device; and
      (8) store said first mobile advertisement into said database.

2. The mobile advertising system of claim 1 wherein said first set of purchase records is public data and said set of mobile device location data records is public data.

3. The mobile advertising system of claim 2 wherein each purchase record within said first set of purchase records includes a store location, a sales timestamp, said credit card identifier, and a product identifier, and wherein each record within said set of mobile device location data records includes a mobile device identifier, a mobile device location, and a mobile device timestamp.

4. The mobile advertising system of claim 3 wherein said server software application matches said subset of purchase records to said first mobile device based on said store location, said sales timestamp, said credit card identifier, said mobile device identifier, said mobile device location, and said mobile device timestamp.

5. The mobile advertising system of claim 4 wherein said server software application determines said product based on subset of purchase records.

6. The mobile advertising system of claim 4 wherein said server software application is further adapted to:
   i. determine an exposed group of mobile devices within said set of mobile devices;
   ii. determine a control group of mobile devices within said set of mobile devices;
   iii. determine a second mobile advertisement based on a purchase history of an exposed group of buyers corresponding to said exposed group of mobile devices and a purchase history of a control group of buyers corresponding to said control group of mobile devices;
   iv. send said second mobile advertisement to said exposed group of mobile devices;
   v. retrieve a second set of purchase records of said exposed group of buyers, wherein each purchase record within said second set of purchase records is created after said second mobile advertisement is sent;
   vi. retrieve a third set of purchase records of said control group of buyers, wherein each purchase record within said third set of purchase records is created after said second mobile advertisement is sent; and
   vii. compare said second set of purchase records to said third set of purchase records to determine an effectiveness measure of said second mobile advertisement.

7. The mobile advertising system of claim 1 wherein said subset of purchase records includes each purchase record in said list of purchase records.

8. The mobile advertising system of claim 1 wherein said subset of purchase records includes a percentage of purchase records within said list of purchase records, wherein said percentage is less than one hundred percent.

* * * * *